P. A. MULCHY.
STACKER HOOD.
APPLICATION FILED OCT. 19, 1911.
1,050,286.
Patented Jan. 14, 1913.
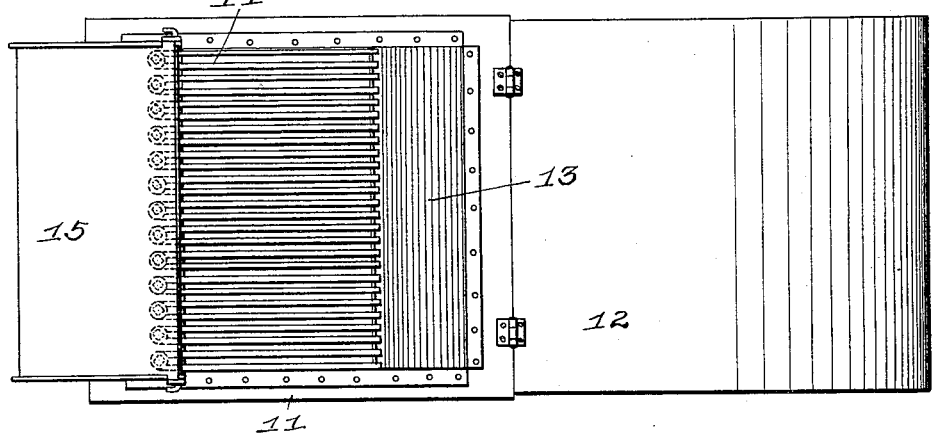
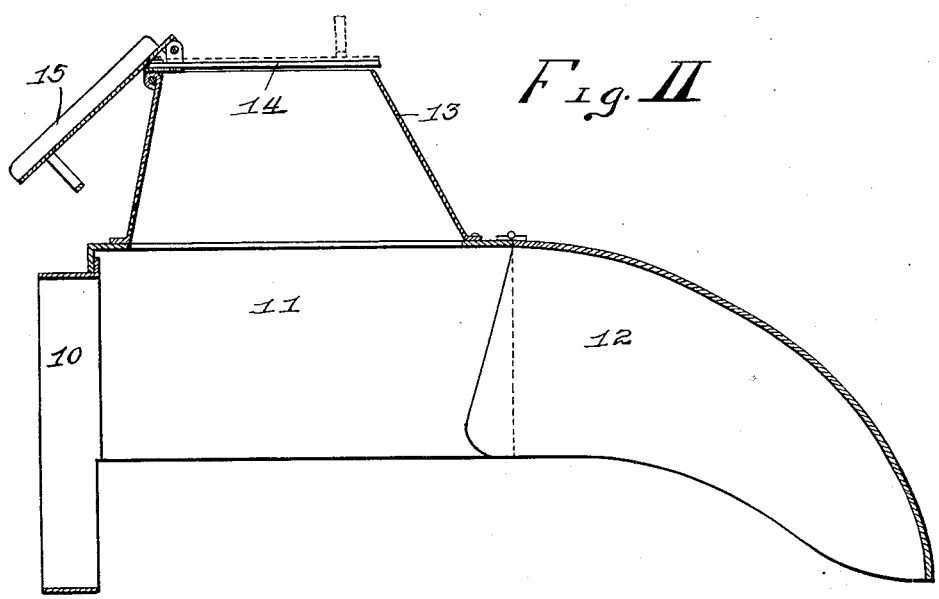
Witnesses
Erle W. Miller
Frank Steiner
Inventor
PATRICK A. MULCHY
By Bell & Roe, Atty.

UNITED STATES PATENT OFFICE.

PATRICK A. MULCHY, OF DES MOINES, IOWA.

STACKER-HOOD.

1,050,286. Specification of Letters Patent. Patented Jan. 14, 1913.

Application filed October 19, 1911. Serial No. 655,652.

*To all whom it may concern:*

Be it known that I, PATRICK A. MULCHY, a citizen of the United States, residing in Des Moines, county of Polk, and State of Iowa, have invented a new and useful Improvement in Stacker-Hoods, of which the following is a specification.

The object of my invention is to provide means to release, and deflect upwardly, the air from a compressor tube of a threshing machine, thereby separating the air from the straw and chaff and permitting the same to fall lightly on the stack.

A further object is to provide a means to check the force of the air blown chaff and deflect it downwardly and, obviously, as at this time the air has been separated from it the chaff will fall lightly to the stack.

I accomplish these objects by means of a hood which I attach to the end of the air compressor tube of a threshing machine.

My invention consists of certain details of construction hereinafter set forth, pointed out in my claim and illustrated in the accompanying drawings, in which—

Figure I shows a plan view of my attachment and; Fig. II shows a longitudinal sectional view of the same.

Referring to the accompanying drawings the reference numeral 10 is used to indicate the air compressor tube of a threshing machine to the outer end of which I have secured, by any ordinary means, a hood, the body portion of which I indicate by the numeral 11. The said body portion extends forwardly from the upper portion of the air tube 10, and hinged thereto, for upward movement, is a downwardly curved member 12, the said member 12 and body portion 11 each being provided with downwardly projecting sides.

The upper portion of the body 11 is provided with a large opening covering which is a capping member, the forward side, 13, of which is inclined as shown. The opening which I have provided at the top of the capping member is covered with an open grating 14 and this grating is also designed to be, at desired times, covered by a top 15 which I have hinged to the cap, as shown.

In practical operation, the top 15 being open, the air and straw being forced through the compressor tube 10 the air strikes the inclined side 13 of the cap portion and is deflected upwardly through the grating. The straw and chaff, from which the air has been liberated falls to the stack and that portion of it which the force carries forward comes in contact with the member 12 and is deflected downwardly. As the chaff is much lighter than the straw it is obvious that it will be mainly the chaff which strikes the member 12. If it is desired to separate, to a great extent, the straw and the chaff the member 12 is elevated and this has the effect of throwing the chaff to the outside of the stack. Again if it is desired to throw the straw and chaff as far as possible from the threshing machine the top 15 is closed and the member 12 elevated thus, obviously, causing the air to blow the straw and chaff to some distance.

Having thus described my invention what I claim and desire to secure by Letters Patent of the United States is:

A hood attachment for threshing machines comprising a body portion open at its top; a cap portion covering said opening and a hinged top for said cap portion; an upwardly and inwardly inclined forward side for said cap portion; a forwardly and downwardly extending member hinged to the forward end of the hood. and means to secure the hood to the end of the air compressor tube of a threshing machine, substantially as shown and described.

PATRICK A. MULCHY.

Witnesses:
LUCILLE ROE,
ZELL G. ROE.

Copies of this patent may be obtained for five cents each, by addressing the "Commissioner of Patents, Washington, D. C."